Patented Aug. 21, 1928.

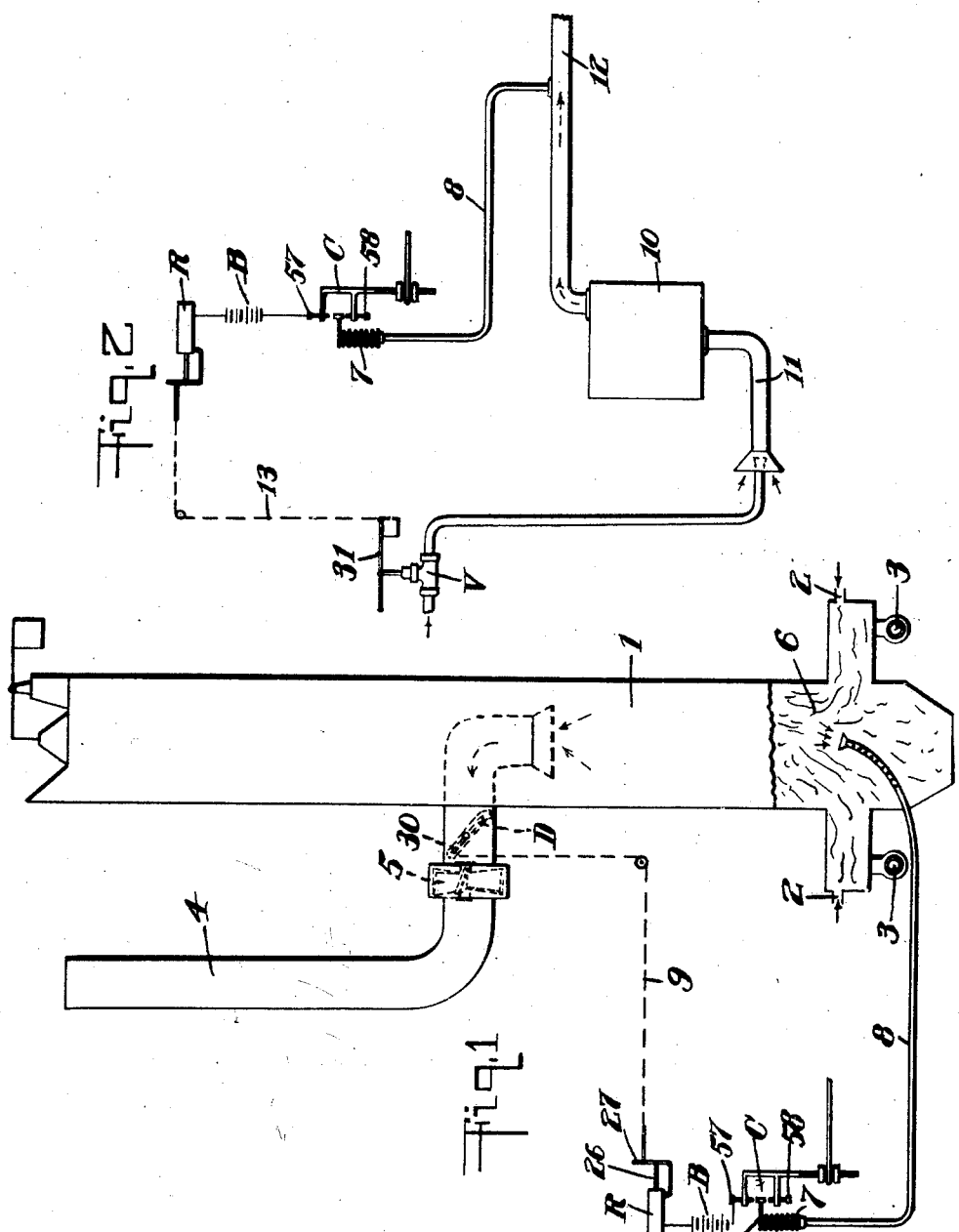

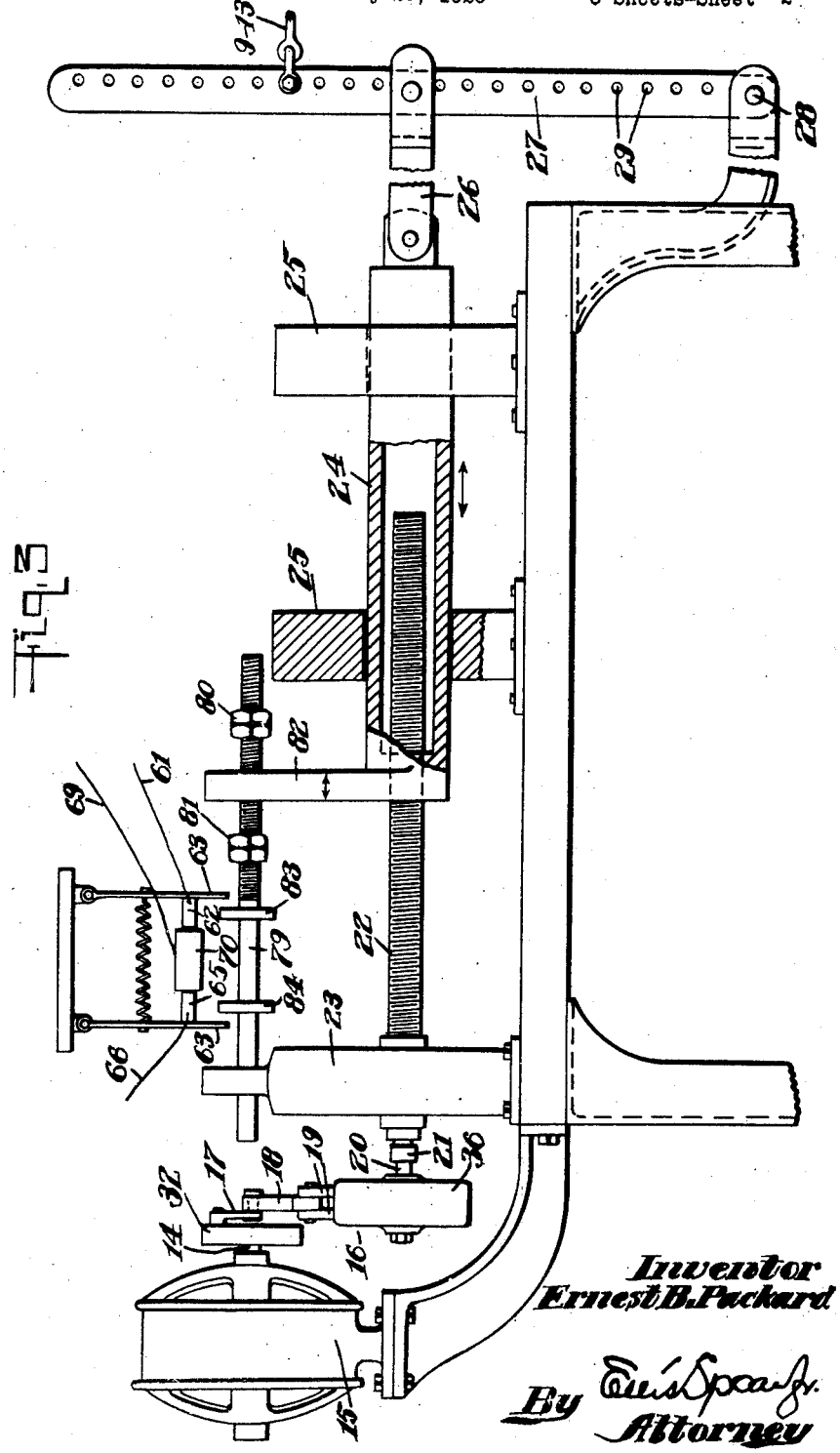

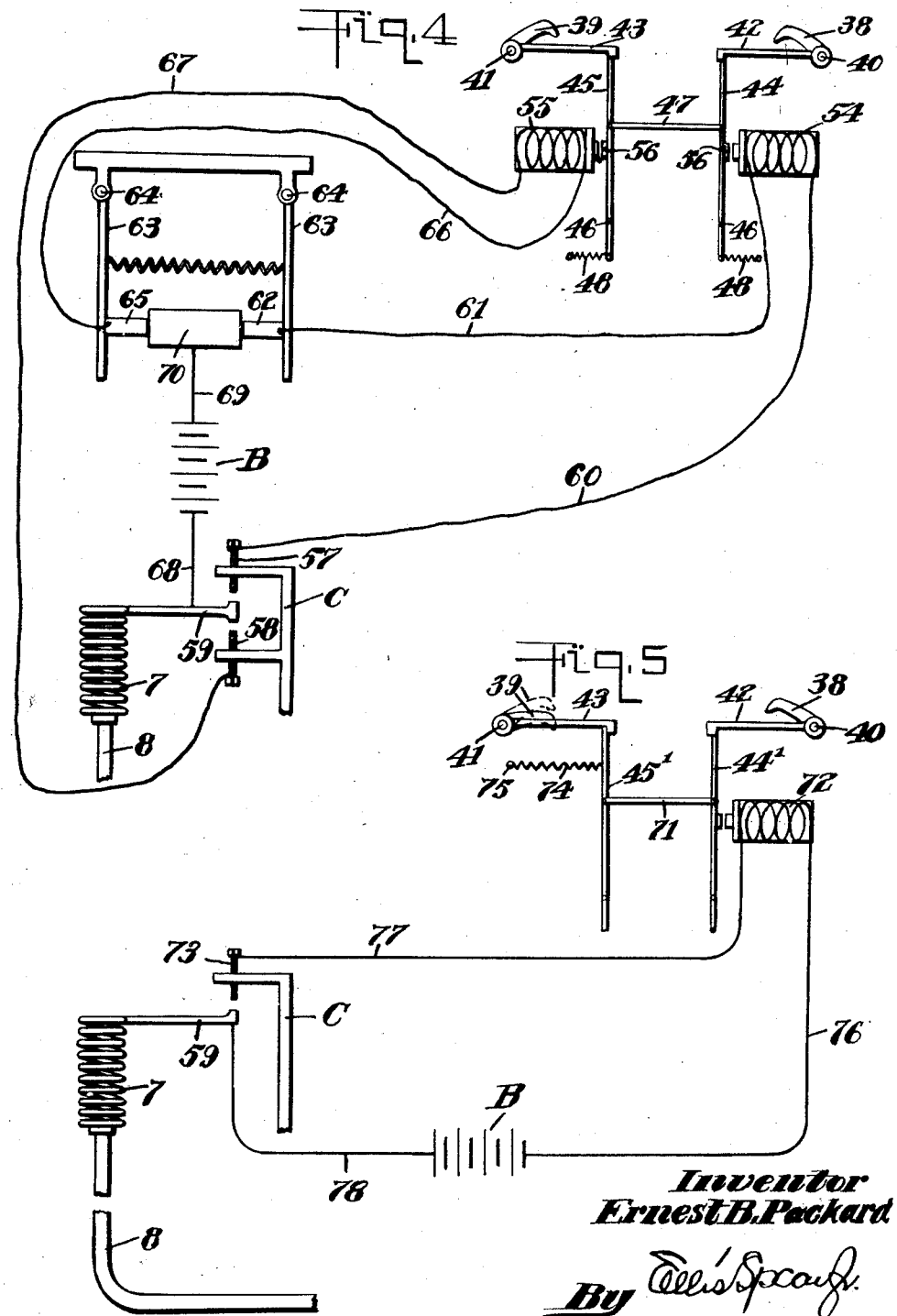

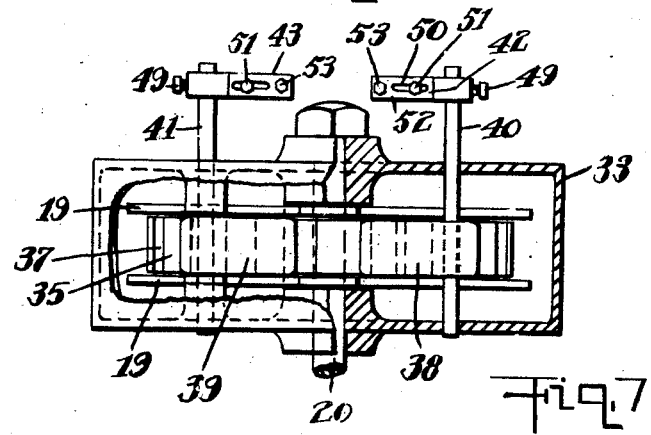
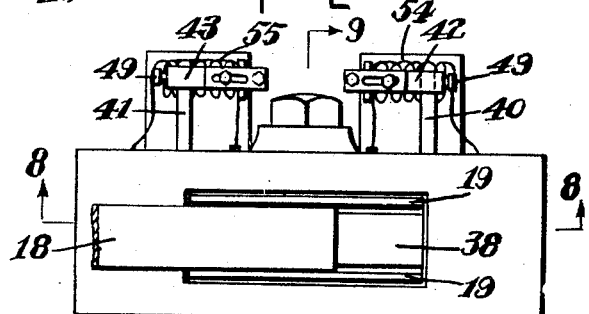
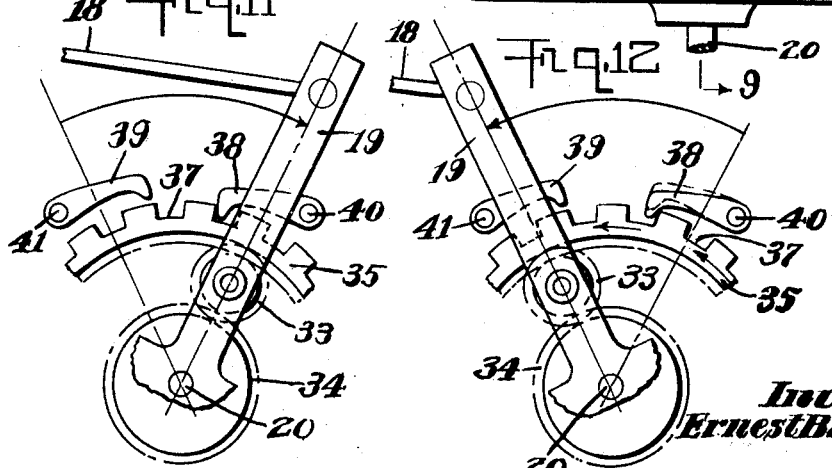

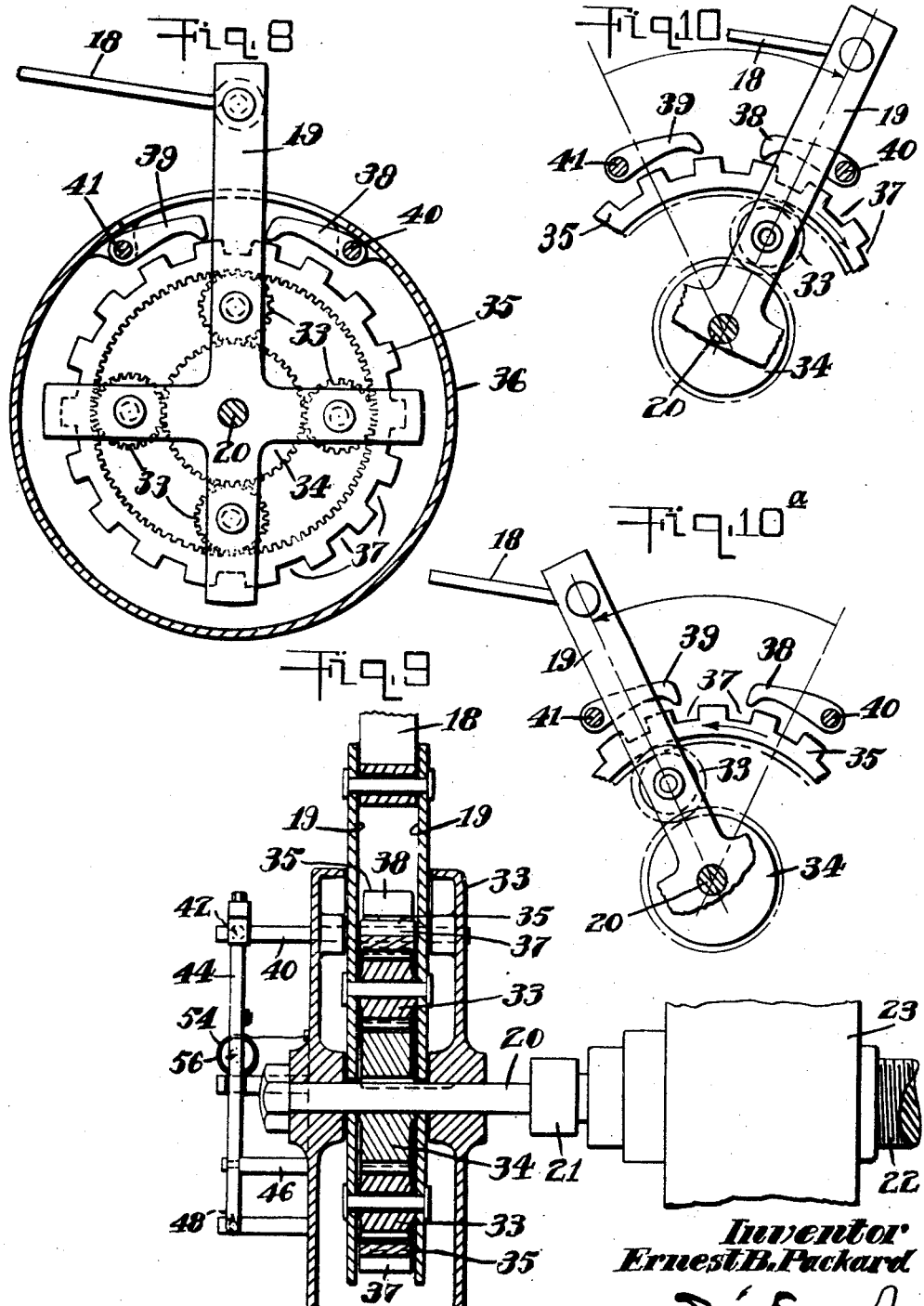

1,681,307

UNITED STATES PATENT OFFICE.

ERNEST B. PACKARD, OF ROCKLAND, MAINE.

VALVE-REVERSING MECHANISM.

Application filed May 29, 1925. Serial No. 33,818.

This invention relates to the automatic regulation of the pressure of gases or fluids, and is particularly designed for the regulation of pressure or vacuum in gas machines, gas mains and exit gas flues. For the purposes of this application, I shall show and describe my invention in its relation to the regulation of the draft in a lime-kiln, although it will be understood that this treatment is purely illustrative and in no way limiting, and that the principles of my invention may be utilized at any place where a regulator is necessary to maintain pressures or a vacuum between certain predetermined limits or at a stated point.

Various expedients for this general purpose have been devised. In one type of regulator, the varying pressure existing in a gas current has been utilized to influence the speed of one or the other of a pair of electromotors, according to the fluctuation of the pressure, and the motor thus varied operated to vary the flow of the gas current in proportion to the throttling effect exerted on the motor. Aside from being complicated in structure, this type of regulator was open to the objection that no provision was made for compensating for any lag between the regulator and the point of service application.

For example, with a regulator of this type applied to a gas producer, the proper electromotor operates to immediately open the steam inlet valve the moment the pressure in the main supply flue drops, and while the degree of opening of the steam valve is proportionate to the drop in pressure in the main supply flue, no provision is made for the "lag," or period of time, (frequently as much as a minute) which elapses before the pressure in the main supply flue responds to the opening of the steam valve.

This lag is due in part to the length of the main supply flue and in part to the fact that the gas producer cannot instantly accustom itself to the change in steam pressure. The immediate effect of this failure to compensate for lag is to fill the main supply flue with pressure in excess of the required amount, and this excess pressure thereupon automatically causes the regulator to operate in the reverse direction to reduce the pressure. On account of the lag, however, this reduction of pressure cannot be accomplished quickly enough to prevent a temporary condition of inadequate pressure.

To the end, therefore, of providing a regulator and method of regulation which will avoid the objections to existing structures, I have devised my present invention. According to it, the varying pressure of the gas or other current is caused to operate a reversing mechanism which automatically and proportionately opens or closes the damper or the steam valve, as the case may be, with a slow, gradual movement so as to compensate for any lag between the regulator and the point of service application.

With other regulators, the valve is either opened or closed so completely that the pressure cannot respond to the change and hence lags behind the valve, so that the regulator is constantly endeavoring to counter-balance either a condition of excess pressure or a condition of inadequate pressure in the system; that is to say, in righting a condition of inadequate pressure, for example, the regulator is compelled to go to the extreme of first producing a condition of excess pressure which it then immediately attempts to overcome by going to the other extreme and producing a condition of inadequate pressure. In other words, due to the uncompensated for lag between the regulator and the point of service application, the regulator cannot maintain pressure or vacuum uniformly between certain predetermined limits or at a stated point.

With my regulator, however, this can be accomplished absolutely and with the utmost degree of sensitiveness by apparatus which is at once simple and relatively inexpensive of construction, installation and upkeep, and certain and reliable in operation. Moreover, it is possible with my construction to set the apparatus at a neutral point at which it will always remain so long as the pressure or vacuum is constant or practically constant without exerting any opening or closing action on the damper or valve, but from which it will immediately pass to proportionately open or close the damper or valve upon a drop or rise in the pressure or vacuum.

The method of practicing my invention, together with suitable apparatus for carrying out the principles involved, is described and illustrated in the accompanying specification and drawings, and the characteristic features of novelty are particularly pointed out in the appended claims.

Throughout the specification and drawings, like reference characters are correspondingly applied, and in the drawings:—

Fig. 1 is a diagrammatic view of a typical installation in accordance with my invention applied to a lime-kiln of standard type.

Fig. 2 is a similar view of the installation applied to a gas producer.

Fig. 3 is an elevation, partly in section, of the regulator unit, and particularly showing the reversing mechanism for automatically opening and closing the damper D of the lime-kiln shown in Fig. 1 or the steam valve V, of the gas producer shown in Fig. 2.

Fig. 4 is a wiring diagram of a two-point contact system wherein the reversing mechanism remains at a neutral point and is ineffective upon the damper or valve so long as the pressure or vacuum is constant or practically constant.

Fig. 5 is a similar view of a single point contact system wherein the reversing mechanism is in constant operation.

Figs. 6 and 7 are a fragmentary section and a plan, respectively, of the planetary gear drive for the reversing mechanism.

Figs. 8 and 9 are sections on the lines 8—8 and 9—9, respectively, of Fig. 7, and Figs. 10, 10ª, 11 and 12 are diagrams illustrating the action of said gearing.

Referring to Fig. 1, wherein I have illustrated a characteristic installation for a gas fired lime-kiln, the numeral 1 indicates generally a kiln of the shaft type using induced draft. The kiln is provided with the usual air and gas inlets 2 and 3, respectively, and with an exit gas flue 4 within which is located the usual suction fan 5 and control damper D in advance of said fan. In order to maintain the draft within the kiln at a stated point or between certain predetermined limits, it is necessary to open or close the damper, as the case may be, as the vacuum fluctuates in the reaction zone of the kiln, which is indicated generally in Fig. 1 by the numeral 6.

According to my invention, therefore, I place a pressure gauge 7 in a pipe 8 leading from the reaction zone 6 of the kiln. The gauge 7 is provided with a circuit maker and breaker, indicated generally at C, which is actuated by the pressure passing through said gauge to open or close an electrical circuit to an automatic regulator, indicated generally at R, which is connected at 9 to the damper D whereby to slowly open or close said damper according to the fluctuation of the vacuum in the kiln as registered by said gauge.

In the alternative form of my invention shown in Fig. 2, the regulator is shown as applied to a gas producer 10 having a steam inlet valve V, steam and air pipe 11, main supply flue 12, and pressure gauge 7 cut into said flue, and the regulator R is connected at 13 with said valve V to open or close the same according to the fluctuation of the pressure in the flue 12.

The construction and operation of the regulator R is the same with both types of installation shown in Figs. 1 and 2, and hence a general description will suffice.

My automatic regulator R includes a shaft 14 (Fig. 3) to which power is constantly applied from a motor, belt, or other power source 15. The power shaft 14 is operatively connected with a reversing mechanism, indicated generally at 16, by any suitable motion-transmitting connections. As here shown, such connections comprise a crank 17 fast on the power shaft 14 and linked by a pitman 18 to a pair of yokes 19. The yokes 19 are here shown as of quadrant form, (Fig. 8) and are loosely mounted on a driving shaft 20 which is coupled at 21 to a feed screw 22 guided in suitable bearings 23.

The feed screw advances or retracts a feed nut 24, according to the direction in which said screw is rotated. The feed nut 24 is guided in suitable bearings 25, and is linked at 26 to a valve or damper control lever 27 which is fulcrumed at 28 and is provided with a longitudinal series of spaced holes 29, within any of which the damper control cord or rod 9 or the valve control cord or rod 13 may be selectively engaged. At its opposite end, the connection 9 or 13 is fast to a counter-weighted, damper-operating lever, 30 which is fulcrumed on the exit gas flue 4 of the kiln (Fig. 1) or to a counter-weighted valve-operating lever 31 connected to the valve V of the gas producer (Fig. 2).

The yokes 19 are constantly oscillated back and forth under the throw of the crank 17, and the throw of the crank and thus the throw of the yokes 19 may be changed to vary the speed of the feed screw 22. This may be conveniently accomplished by pivoting the upper end of the crank 17 to a disc 32 (Fig. 3) rotating with the power shaft 14.

Journaled in the oscillating yokes 19 is a plurality of pinion shafts, here shown as four in number, carrying pinions 33 (Figs. 8 and 9) which mesh with a central gear 34 keyed to the driving shaft 20 and with a ring gear 35 surrounding said pinions. All gears are enclosed in a case 36 which is filled with lubricant.

The periphery of the ring gear 35 is notched, as indicated at 37, to provide in effect a ratchet with which cooperate a pair of pawls 38 and 39, mounted on rock shafts 40 and 41, respectively. Said shafts are provided at their outer ends with trip-arms 42 and 43 which are normally supported on the upper ends of a pair of spring-tensioned levers 44 and 45, respectively, (Figs. 4 and 5). The levers 44 and 45 are fulcrumed at 46, are linked together at 47, and are spring-tensioned as indicated at 48. The upper ends of the levers 44 and 45 are twice as wide as the hook ends of the trip arms 42 and 43, so that one arm will always be supported by a lever regardless of the direction in which the lever pair is drawn. The trip arms themselves are mounted for universal adjustment relative to the levers. Referring to Fig. 6, it will be noted that said arms are rotatively adjustable about their rock shafts 40 and 41 as axes, being held by set screws 49, and that said arms are longitudinally slotted, as indicated at 50 to receive holding screws 51 which adjustably connect trip extensions 52 to said arms, said slots 50 and screws 51 permitting longitudinal adjustment of said extensions 52 relative to the trip arms proper. Adjustable vertically through the outer ends of each extension 52 is a trip 53 which may be a simple set screw having its lower end formed as a hooked bearing adapted to ride on the upper end of its supporting lever 44 or 45.

In the double contact system shown in Fig. 4, an electro-magnet 54 and 55 is provided for each lever, and each lever carries an armature 56. The electro-magnets are in circuit with the circuit breaker C, which in this instance consists of a pair of alined adjustable contact points 57 and 58 between which plays a make and break arm 59 (Fig. 4) operated from the pressure gauge 7 according to the fluctuations of the pressure.

The wiring diagram is as follows:—One terminal of the electro-magnet 54 is connected directly to the contact 57 by a lead wire 60. The other terminal of said magnet is connected by a lead wire 61 with one of the terminal contacts 62 of a limit switch.

This switch consists of a pair of spring-tensioned arms 63, which are hinged at their upper ends at 64 and at their lower ends carry the moving contact terminals 62 and 65. The terminal 65 is connected by lead wire 66 with one terminal of the magnet 55. The other terminal of said magnet is connected by lead wire 67 with the contact 58, and the make and break arm 59 is connected by a lead wire 68 with one pole of a battery B or other source of electrical current. The other terminal of said battery is connected by lead wire 69 with a stationary contact 70 disposed between and normally contacting the contact terminals 62 and 65.

In the modification shown in Fig. 5, I illustrate a single point system. The supporting levers 44', 45' for the trip arms 42, 43 are connected to each other at 71 to move in unison, as in the double point system previously described, but only one electro-magnet 72 and only one pressure contact point 73 is used. When the electro-magnet 72 is energized, the armature carrying lever 44' is drawn towards said magnet, and this movement is opposed by a coil spring 74 which is anchored to the opposite supporting lever 45' and to a fixed point 75. One terminal of the electro-magnet 72 is connected by a lead wire 76 with one pole of the battery or other current source B. The other terminal of the electro-magnet is connected by lead wire 77 with the contact 73, and the make and break arm 59 which is normally separated from the contact 73 is connected with the other terminal of the battery B by a lead wire 78 so that the circuit is normally open and the magnet de-energized.

In order to stop the damper D or valve V at any desired point, I provide a control bar 79 adjacent the feed screw 22. Adjustable on said bar is a pair of stop nuts 80 and 81 which are usually set at the maximum opened and closed positions of the damper or valve and which may be adjusted along the control bar to change the position of the point of opening and closing thereof. The feed nut 24 carries a stop pin 82 which plays between the stop nuts. When the feed nut has moved to the limit of its travel in either direction, as determined by the position of the stop nuts, the stop pin 82 will contact one or the other of said nuts, and one or the other of a pair of circuit breaker arms 83, 84 on said control rod 79 will be brought against one or the other of the hinged arms 63 of the limit switch to rock said arm on this pivot and thereby separate the contact 62 or 65 from the stationary contact 70. This insures that the opening or closing movement of the valve or damper will not be carried farther than the maximum point for which it is set.

The operation of the regulator is as follows:—In the normal position of the parts, the power shaft 14 is being constantly rotated and through the crank connection 17 is constantly oscillating the yokes 19 carrying the pinions 33 and ring gear 35 back and forth relative to the central gear 34 on the driving shaft 20 (see Figs. 10 and 10ª). This motion is an idle motion, however, and no driving influence is imparted to the central gear 34 and thus to the driving shaft 20 and feed screw 22, due to the fact that in this position of the parts both trip arms 42, 43 for the pawls 38 and 39 are supported on the armature levers 44, 45 of the electro-magnets. This may be said to be the normal condition of the apparatus, that is, this is the operation of the apparatus when the pressure is at the point at which the regulator is set to work. In this condition, the make and break arm 59 in Fig. 4 is separated from both contact points 57 and 58 and both contacts 62 and 65 of the limit switch are in contact with the stationary contact 70.

Upon any variation of the pressure in the exit gas flue 4, Fig. 1, or supply main 12, Fig. 2, the arm 59 moves towards one or the other of the contacts 57 and 58 according to whether the pressure has increased or decreased. Inasmuch as the operation is the same with either an increase or a decrease of pressure, it will be sufficient to describe the operation for only one of these two possible conditions. Assuming that the pressure increases, the arm 59 automatically rises and makes contact with the contact 57, thereby closing the circuit through the electro-magnet 54, which magnet is now energized and attracts the armature lever 44 towards it. This withdrawal of the armature lever from beneath the trip arm 42 allows said trip arm to drop by gravity, and the pawl 38, therefore, drops into one of the notches 37 of the ring gear 35 so as to check the oscillatory motion of said gear in its clockwise direction. (See Fig. 11.) The pinions 33 now begin to rotate about their own axes in a counter-clockwise direction and to travel bodily in a clockwise direction for a short distance around the ring gear 35, thereby rotating the central gear 34 in a clockwise direction during the full throw of the yokes 19 in their clockwise movement, as indicated by the arrow in Fig. 11. The feed screw is, therefore, rotated clockwise through a part of a revolution and through the feed nut 24 and connections 26, 27 and 9 moves the damper D (or valve V) towards its closed position.

On the return stroke of the yokes 19, the pawl 38 is lifted out of the notch of the ring gear into which it had dropped and ratchets idly over the teeth of said gear, as indicated in dotted lines in Fig. 12. The opposite pawl 39, however, is still being supported by the armature lever 45 of the electro-magnet 55 which magnet has not been energized and, therefore, said pawl 39 is ineffective upon the ring gear. When the yokes 19 reach the limit of their counter-clockwise stroke and again begin their clockwise stroke, the unsupported pawl 38 again drops into a notch of said gear and the feed screw is again rotated clockwise through a part of a revolution to further move the damper or valve towards its closed position. This operation is repeated until the pressure at which the regulator is set has been again reached, at which time the make and break arm 59 will separate from the contact 57 and will assume its neutral position between said contact and the contact 58.

Should, for any reason, the pressure fail to again reach the point at which the regulator is set to work, the limit switch will become automatically effective to prevent further opening or closing movement, as the case may be, of the valve or damper. This is accomplished as follows:—In the closing action just described, the stop pin 82 is being moved towards the right in Fig. 3, due to the rotation of the feed screw. The continued movement of said pin in this direction would carry the pin against the stop nut 80 and would cause the circuit closer abutment 83 to swing the adjacent arm 63 of the limit switch towards the right in Fig. 3, thereby separating the contact 62 from the stationary contact 70. This would break the circuit to the magnet 54, thereby de-energizing said magnet and allowing the return spring 48 for the opposite armature lever 45 to return both levers to the position of Fig. 4, and hence lever 44 would again be in supporting position relative to the trip arm 42 for the pawl 38, so that said pawl could no longer be effective on the ring gear.

The operation of the single point system shown in Fig. 5 is as follows:—

When the pressure increases, the arm 59 will be carried upwardly against the contact 73, thereby closing the battery circuit and energizing the electro-magnet 72. The armature lever 44' is attracted towards said magnet and the lever 45' moves with it to the right in Fig. 5, against the action of the return spring 74. The support 44' for the trip arm 31 of the pawl 38 would, therefore, be withdrawn and said pawl would drop into a notch of the ring gear, as in the manner described in the double point system, to cause the feed screw 22 to rotate in the proper direction to close the valve V or damper D. As soon as the pressure is again reduced to the point at which the regulator is set to operate, the contact arm 59 will automatically separate from the contact 73, thereby opening the battery circuit and de-energizing the magnet 72, to permit the coil spring 74 to draw the trip arm supporting levers 44' and 45' to the left in Fig. 5 a distance sufficient to permit the trip arm 43 for the pawl 39 to drop, as indicated in dotted lines in Fig. 5, and said pawl will, therefore, become effective to cause the feed screw to rotate in the opposite direction and thereupon again open the damper or valve. Fig. 5 of the drawings shows the parts in this position. The operation in the single point contact system is continuous and repeated, the feed screw being constantly rotated in one direction or the other, according to the fluctuation of the pressure.

With this single contact system, it is possible to so set the apparatus as to cause it to respond to very slight changes in pressure, thus making the regulator extremely sensitive in operation. In fact, the feed screw can be maintained in substantially balanced position, rotating through approximately only a quarter of a revolution in either direction, thus holding the pressure in the tank or flue at any desired point. By adjusting the contact 73 towards or from the make and break arm, the apparatus can be set to operate for greater or lesser pressures.

With the double contact system, it is possible to set the apparatus at a neutral point at which the feed screw will not be turned in either direction when the proper amount of pressure or vacuum is obtained. By setting the adjustable contacts closer to or farther away from the make and break arm, the neutral point of the regulator may be correspondingly varied.

Where the device is to be used for the regulation of vacuums instead of pressures, a vacuum gauge will, of course, be substituted for the pressure gauge.

By changing the adjustment of the connection 9 or 13 in the holes of the lever 27, a faster or slower motion may be imparted to the valve or damper without changing the revolutions per minute of the feed screw.

Where necessary, a relay may be cut into the electro-magnet circuit, although for very light work, the relay is unnecessary. The term "valve" as used in claims means either a valve as such, or a damper or any other device for regulating the passage of a fluid or gas through a passage.

Various other modifications in the form and construction of my device may obviously be resorted to without departing from the spirit of my invention, if within the limits of the appended claims.

What I therefore claim and desire to secure by Letters Patent is:

1. Valve reversing mechanism, comprising a rotatable reversing device, a continuously oscillating member for rotating said reversing device in one direction or the other, and a planetary gear drive normally permitting said oscillating member to oscillate idly but effective under certain conditions to transmit movement in one direction or the other to said reversing device.

2. Valve reversing mechanism, comprising a reversing device, a continuously oscillating ratchet, a pair of pawls independently effective upon said ratchet, and a planetary gear drive between said ratchet and reversing device normally permitting said ratchet to oscillate idly but effective upon engagement of one or the other of said pawls with said ratchet to transmit movement in one direction or the other to said reversing device.

3. Valve reversing mechanism, comprising a rotatable reversing device, a continuously oscillating ratchet, a pair of gravity operative pawls independently and singly operative on said ratchet, an individual support for each pawl, means simultaneously effective upon both pawl supports when operated to remove one pawl support only from supporting relation to a pawl whereby the released pawl may engage said ratchet, and, means between said ratchet and said reversing device permitting said ratchet to oscillate without transmitting rotation to said reversing device while both pawls are supported but effective upon engagement of one or the other of said pawls with said ratchet to transmit rotation in one direction or the other to said reversing device.

4. Valve reversing mechanism, comprising a rotatable reversing device, a continuously oscillating ratchet, a pair of gravity operating pawls disposed on opposite sides of the axis of rotation of said ratchet and independently and singly operative on said ratchet, an individual support for each pawl, means simultaneously effective upon both pawl supports when operated to remove one pawl support only from supporting relation to a pawl whereby the released pawl may engage said ratchet, a planetary gear drive between said ratchet and said reversing device permitting said ratchet to oscillate without transmitting rotation to said reversing device while both pawls are supported but effective upon engagement of one or the other of said pawls with said ratchet to transmit rotation in one direction or the other to said reversing device.

5. Valve reversing mechanism, comprising a rotatable reversing device, a continuously oscillating yoke, a ratchet carried by said yoke and having an internal series of gear teeth, a pair of gravity operative pawls independently and singly operative on said ratchet, an individual support for each pawl, means simultaneously effective upon both pawl supports when operated to remove one pawl support only from supporting relation to a pawl whereby the released pawl may engage said ratchet, means including a plurality of pinions carried by said oscillating yoke and meshing with said internal gear teeth of said ratchet and a central pinion operatively connected with said reversing device and meshing with said pinions for permitting said ratchet to oscillate without transmitting rotation to said reversing device while both pawls are supported but effective upon engagement of one or the other of said pawls with said ratchet to transmit rotation in one direction or the other to said reversing device.

In testimony whereof I affix my signature.

ERNEST B. PACKARD.